(12) United States Patent
Miller

(10) Patent No.: US 6,254,752 B1
(45) Date of Patent: Jul. 3, 2001

(54) PROCESS FOR ELECTROCHEMICAL TREATMENT OF CONCRETE

(75) Inventor: John B. Miller, Oslo (NO)

(73) Assignee: Fosroc International Limited (GB)

( * ) Notice: Subject to any disclaimer, the term of this patent is extended or adjusted under 35 U.S.C. 154(b) by 0 days.

(21) Appl. No.: 09/367,269
(22) PCT Filed: Feb. 12, 1998
(86) PCT No.: PCT/GB98/00462
§ 371 Date: Oct. 19, 1999
§ 102(e) Date: Oct. 19, 1999
(87) PCT Pub. No.: WO98/35922
PCT Pub. Date: Aug. 20, 1998
(51) Int. Cl.$^7$ .................................................... C25F 7/00
(52) U.S. Cl. ........................ 204/515; 205/766; 106/795; 106/805
(58) Field of Search ........................... 204/515; 205/766; 106/805, 795

(56) References Cited

U.S. PATENT DOCUMENTS 5,407,543 * 4/1995 Miller .................................. 204/130

FOREIGN PATENT DOCUMENTS

WO 9321130
A1 10/1993 (WO).

* cited by examiner

Primary Examiner—Arun S. Phasge
(74) Attorney, Agent, or Firm—Nixon & Vanderhye P.C.

(57) ABSTRACT

An electrochemical process for the removal of chloride ions from reinforced concrete includes passing a direct current between (i) an anode in electrical contact with the adherent coating containing a water retaining adhesive material, and an aqueous electrolyte applied to an external surface of the concrete and (ii) a cathode which is located internally in the concrete. According to the process, chloride ions are caused to migrate to the anode. In order to reduce the production of chlorine gas, the coating contains, as a chlorine scavenger, solid calcium hydroxide or barium hydroxide, or mixtures thereof. The chlorine scavenger is most preferably present in an amount of at least 8%, and more preferably 20 to 50%, by weight based on the dry weight of the water retaining material.

13 Claims, 1 Drawing Sheet

PROCESS FOR ELECTROCHEMICAL TREATMENT OF CONCRETE

This application is a 371 of PCT/GB98/00462 filed Feb. 12, 1998.

FIELD OF THE INVENTION

This invention relates to a process for the electrochemical removal of chloride from concrete and to a composition for use in the process.

BACKGROUND OF THE INVENTION

The presence of chloride ions in reinforced concrete is known to be deleterious and it has been previously proposed to remove chloride ions by a process which has become known as desalination. This process has been described in European Patents Nos. 200,428 and 398,117 and involves passing an electric current through the concrete by applying a voltage for example 3 to 15 volts between an external temporary anode and the steel reinforcement in the concrete. The external temporary anode is usually covered in a layer of electrolyte which often includes in addition to the electrolyte an adherent coating material. The effect of the electric current is to cause chloride ions within the concrete to migrate through the concrete towards the surface and into the electrolyte layer. European Patent No. 398,117 describes the use of a fibrous cellulose pulp in the coating and the mixing of the pulp fibres with a liquid to form a self adherent material which is applied to the exterior surface of the concrete by spraying whereby an anode which has been previously applied to the concrete surface is embedded in a fibrous cellulose coating. Loss of alkalinity in reinforced concrete is also known to be deleterious. The loss of alkalinity is caused by carbon dioxide and other atmospheric gases such as sulphur dioxide. A process for increasing the alkalinity of concrete whose pH has been reduced by atmospheric gases has been previously described in European Patent No. 264,421 and U.S. Pat. No. 4,865,702. In this process an electric current is passed between an externally applied electrode which is in contact with an alkaline solution and the internal reinforcement of the concrete as cathode. The result of the process is to increase the concentration of hydroxyl ions in the region of the reinforcement and thereby increase the alkalinity of the concrete. The benefit of doing this is that corrosion of the reinforcement is reduced or prevented. The process has become known as realkalization.

Problem to be solved by the Invention

The anode employed in desalination may be made of either an inert material for example expanded titanium mesh coated with electrocatalytic oxides of platinum metals, or made of a consumable metal such as reinforcing steel net.

The passage of the electric current produces acid around the anode. The concrete surface may be stained or damaged and in the case of a consumable electrode, corrosion of the anode may occur.

Also in a desalination process discharge of the chloride ion at the anode produces chlorine gas which, in enclosed spaces can lead to unpleasantly high or even hazardous levels of the gas. Corrosion of metal fittings may also occur. Previously the formation of acid and chlorine has been combated by adding to the electrolytic layer substances which buffer the pH.

This can to some extent reduce chlorine formation because the latter tends to be suppressed with increasing pH. The materials which have been previously used have been mixtures of fire retarding agents such as hydrated alumina and soluble pH buffers such as sodium borate. The amount of pH buffer which can be added is not normally sufficient to last throughout the usual treatment period. Also the pH which can be attained in practice is not high enough to significantly suppress the production of chlorine gas.

European Patent No. 200,428 describes an electrochemical process for the removal of chloride from reinforced concrete in which the anode is embedded in a coating of a material capable of absorbing chloride such as a retarded gunite. Gunite is a finely graded concrete (ie a mixture of cement and sand) which is suitable for application by spraying. The gunite is retarded to prevent it hardening before completion of the electrochemical process. However gunite is a heavy and unpleasant material to work with and presents a disposal problem when removed from the concrete at the end of the process. It is now preferred to use adhesive materials which are lighter, are also able to retain larger amounts of water and are more easily disposed of at the end of the process.

U.S. Pat. Nos. 5,198,082 and 5,228,959 describes the use as the anode of a ferrous metal such as steel particularly in the form of a grid, the effect of which is to react with the chloride ions and corrode thereby reducing the liberation of chlorine gas. These patents disclose that in most cases the development of corrosion products can be compensated for by increasing the voltage level up to 40 volts but that in severe cases it may be necessary to replace the anode grid.

A solution to the above described problem of chlorine formation has now been invented in which calcium hydroxide or barium hydroxide is employed as a chlorine scavenger in the adherent coating.

SUMMARY OF THE INVENTION

According to the present invention a process for the electrochemical removal of chloride ions from chloride-containing reinforced concrete comprises: passing a direct current between (i) an anode in electrical contact with a coating containing a water retaining material and an aqueous electrolyte applied to an external surface of the concrete and (ii) a cathode which is located internally in the concrete, which process causes chloride ions to migrate to the anode and wherein to reduce the production of chlorine gas, the coating contains, as a chlorine scavenger, solid calcium hydroxide or barium hydroxide or mixtures thereof, the chlorine scavenger being present in an amount of at least 8% by weight based on the dry weight of the water retaining material.

ADVANTAGEOUS EFFECT OF THE INVENTION

The advantage of the present invention is that the production of chlorine gas is reduced.

DETAILED DESCRIPTION OF THE INVENTION

Figure 1:
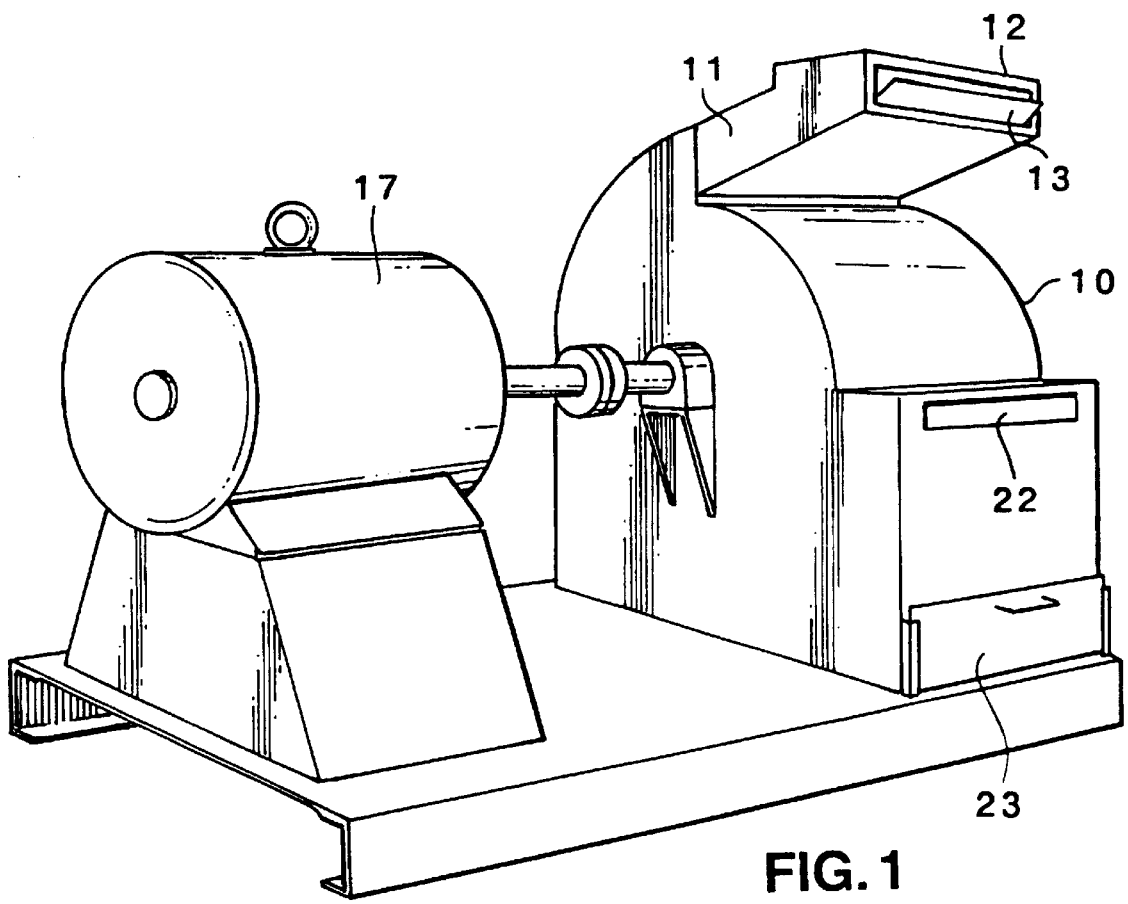
FIG. 1 is a perspective view of a dry hammer mill and its driving motor suitable for use in preparing fibre for use in the present invention.

The process of the present invention may be run to remove from 50% to 80% of the chloride which is initially present in the concrete.

The water retaining material is preferably adhesive by which is meant that it is capable of adhering to a concrete surface which may be an inclined surface.

The water retaining material may be an organic material such as cellulose fibre although inorganic materials for example calcium hydroxide itself may be used.

Conveniently the water retaining material can hold at least 100% its own weight of water and preferably at least 200%, more preferably at least 300% for example 300 to 500%.

In one embodiment of the process the coating may be calcium hydroxide itself and the process may be carried out by forming a coating of calcium hydroxide on the surface of the concrete (desirably a horizontal surface), then applying the anode for example in the form of a grid or net and then applying a further layer of calcium hydroxide over the anode. Water may then be applied to the coating to provide an aqueous layer over the calcium hydroxide coating. The water dissolves a small amount of the calcium hydroxide to form a saturated solution of calcium hydroxide which functions as an aqueous electrolyte. It is not essential to maintain a layer of water on the layer of calcium hydroxide although it is convenient to do so to ensure that the calcium hydroxide is kept moist. The water may be held in place by means of a tank temporarily fixed to the concrete for example by bolts.

Usually the primary purpose of the process in the present invention is to remove chloride ions (and such a process would be normally referred to as a desalination process).

However there will also be processes where the primary purpose is to effect an increase in the alkalinity of the concrete (such a process would normally be called realkalization) and where the concrete contains chloride ions and these migrate to the anode with the risk of their being discharged as gas. Such processes are intended to be within the scope of the present invention since some removal of chloride takes place. However when alkali metal carbonates are employed in realkalization (normally this would be as a solution in contact with the surface and the external anode) it is preferred not to use the chlorine scavengers of the invention because of the risk of precipitating calcium carbonate or barium carbonate and the formation of sodium hydroxide leading to a loss of chlorine scavenging ability. When no alkali metal carbonate is employed for example when treating concrete prone to the alkali silica reaction then the chlorine scavengers of the present invention may with advantage be used.

By reinforced concrete is meant any concrete containing steel.

The calcium or barium hydroxide scavenger reacts with chlorine to substantially reduce the mount of chlorine liberated and the term scavenger is not intended to mean that all traces of chlorine are removed.

The cathode is conveniently provide by the reinforcement of the concrete.

The anode and its associated coating containing electrolyte can be preformed and applied to the concrete surface as an assembly.

Preferably however the anode is applied to the concrete surface and then coated with an electrolyte-containing medium for example as described in European Patent No. 398,117 and U.S. Pat. No. 5,320,722. As described in these patents the anode may be first mounted on the concrete and the surface sprayed with a composition comprising a fibrous cellulosic pulp mixed with an electrolyte to form an adherent coating containing the electrolyte.

These patents further disclose that the pulp may be formed of natural cellulose fibres with addition of mineral fire and smoulder retardants such as borax, magnesium and aluminium oxides and certain silicates although the need for these is reduced in the present invention.

For use in the present invention the dry fibre is conveniently mixed with the solid calcium or barium hydroxide in the process for the preparation of the fibre eg the milling of the cellulose and supplied to the job site as a mixture where it is mixed with water, for example, by supplying the cellulose fibre/scavenger mixture and water as two components to a suitable spray nozzle in which they are mixed and from which is emitted a spray containing a mixture of the two.

Preferably the water retaining adhesive material is fibrous and preferably the fibres are cellulose for example recycled or reconstituted cellulose pulp. Conveniently the cellulose pulp is derived from newsprint or other waste paper.

Processes for the production of celluose fibres are known in the art and are in commercial operation. Cellulose fibre is known as a replacement for asbestos fibres in a number of applications such as panels, tile adhesive, refractory linings and especially fibre cement panels.

In a typical process for the preparation of cellulose fibres the feed in the form of waste newsprint in sheet form is passed to a shredder from where the shredded paper is passed through the first of two hammer mills such as a Jacobson mill. The mill has rotating hammers or blades which together with air suction force the material through a perforated metal screen. The material, which at this point is partly fibrised, is passed to a second hammer mill. At a point between the two hammer mills chemicals such as fire retardants are added. In the preparation of fibre for use in the present invention the calcium or barium hydroxide is added at this point. The material is then passed through the second hammer mill in which it is further fibrised. The product is then compressed and extruded into bags for storage.

The fibres after leaving the second hammer mill usually have a length of between 0.5 and 2.0 mm. The freeness of the fibres may be in the range 45 to 75° SR (Shopper-Riegler).

According to another aspect of the invention a composition for application to a concrete surface to form an adherent coating comprises (i) an organic material capable of retaining water, said organic material forming an adhesive mixture when mixed with water and (ii) at least 10% by weight of calcium or barium hydroxide based on the dry weight of the organic material.

The above composition is mixed with water to provide a adhesive material suitable for application to a concrete surface by spraying. The amount of calcium hydroxide or barium hydroxide present is preferably from 20 to 50% more preferably from 25 to 45% by weight based on the weight of the dry adhesive coating material which is preferably a cellulosic fibre.

A mixture of calcium hydroxide and barium hydroxide may be used in which case the above mentioned figures refer to their combined weights.

These amounts of calcium hydroxide result in a greatly improved suppression of chlorine due to the capacity of solid calcium hydroxide to react with chlorine and also achieves pH buffering which is superior to previous pH buffers in that the quantity of material available for reaction with acids is comparatively large.

Figure 2:
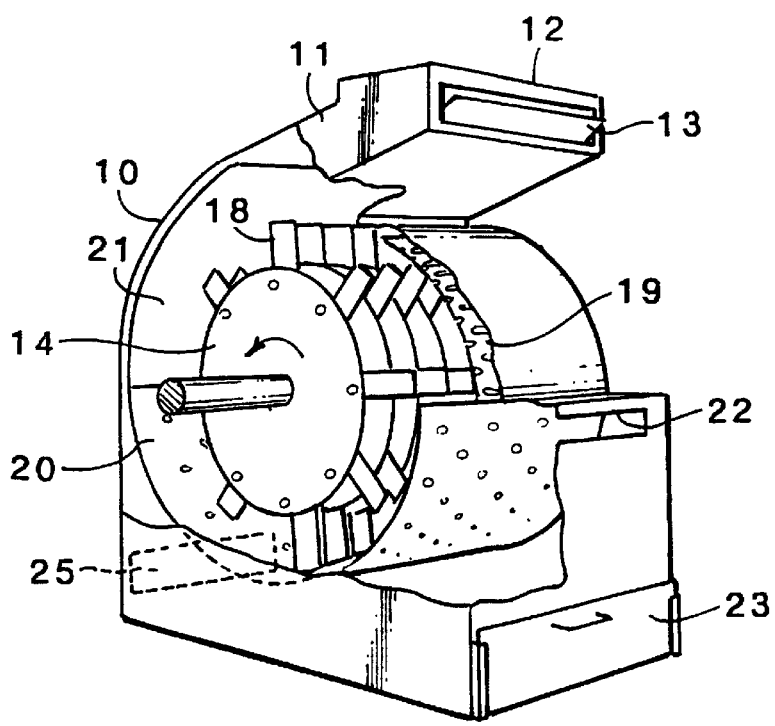
FIG. 2 is a perspective view, partly cut away of the same mill.

Preparation of the cellulose fibre by dry milling. The feedstock is either a virgin cellulose pulp or recycled/reconstituted cellulose such as waste newsprint. The feed is first broken up into small portions having an overall size between about 5 mm and 20 mm square. The initial breaking down may be performed in a conventional shredder. The resulting broken up material is then delivered to a Jacobson hammer mill of the type illustrated in FIGS. 1 and 2. This hammer mill comprises a casing 10 having an entry chute 11 with an inlet opening or table 12 and a feed damper 13. Within the casing is a rotary element comprising a hub 14 driven via a coupling from a driving motor 17. The hub supports the individual hammers 18 which cooperate with the cutting plate 19, screen 20 and back plate 21. The speed of operation of the machine is between 1500 and 3000 rpm and the hammer tip speed is approximately 2200 fpm at 3000 rpm. The screen diameter is approximately 30 inches and the screen aperture size may vary from approximately 50 mm down to about 1 mm. The screen area may be between about 1000 and 2000 square inches and the hammer size is preferably between about ¼×2×7¼ inches and ½×2×7¼ inches.

The rate of flow through the hammer mill can vary considerably and can depend on the type of mill and size screen size and type of fibre and whether chemical additives are included. If inorganic chemicals are added as grinding aids the volumetric throughput will be altered significantly. Typical feed rates are between about 3 and 5 tonnes/hour. The hammer mill may also include means for introducing vent air through an upper air vent 22 and a lower inlet controlled by a vent slide 23 and the resulting pulverised separated fibres are removed from the base of the mill at 25. To the fibres is added the calcium hydroxide, preferably 25% by weight and the mixture passed through a second hammer mill similar to the first.

The invention is illustrated by the following Example.

EXAMPLE

Four identical reinforced concrete plates (reinforced with a mild steel net) measuring 700×700×50 mm were prepared by casting from the same mix containing 3% of the total weight of sodium chloride. The plates were subjected to desalination treatment using as an anode a titanium mesh embedded in cellulose fibre mixed with water. The desalination was carried out at 1 Amp/m$^2$ of concrete surface. The fibre in the case of two plates was conventional containing conventional additives. The particular fibre used is known as NCT FG 2000 and is produced by Excel Industries Ltd in Ebbw Vale Gwent Wales from whom it is commercially available. The fibre in the case of the other two plates was according to the invention, the fibre itself being identical to that in NCT FG 2000 but instead of the conventional additives contained 25% by weight of calcium hydroxide based on the dry weight of the cellulose fibre. The calcium hydroxide had been added during the milling of the cellulose as described above in place of the conventional additives. The fibre coatings were applied by spraying together with water in known manner.

One plate with fibre of each formulation was then placed during desalination in enclosed chambers measuring approximately 1000×100×10 mm and the concentration of chlorine gas in the atmosphere in each chamber was measured at regular intervals using Draeger equipment.

Two plates were left unpowered and exposed to the air for observation of the drying properties of the two types of fibre.

The chlorine concentration of the atmosphere in the chamber containing the fibre formulation according to the invention was below the level of detection at an early stage. After a period of time corresponding to approximately half the normal desalination process (during which 580 Ampere hours of current were passed) the chlorine content of the atmosphere in the chamber containing the fibre according to the invention was only between ⅕₀th (fiftieth) and ¹⁄₁₂₀th (one hundred and twentieth) of that of the chamber containing the conventional fibre.

In the case of the two plates which were exposed to the atmosphere, the fibre containing calcium hydroxide formed a crust caused by reaction between calcium hydroxide and atmospheric carbon dioxide. The calcium carbonate which had formed resulted in a weak segmentation of the surface of the fibrous mass which rendered the mass less prone to loss of moisture by evaporation.

A further advantage of the process of the invention is that the production of acid, especially hydrochloric acid at the anode is reduced.

What is claimed is:

1. A process for the electrochemical removal of chloride ions from chloride-containing reinforced concrete which process comprises:

passing a direct current between (i) an anode in electrical contact with a coating containing a water retaining material and an aqueous electrolyte applied to an external surface of the concrete and (ii) a cathode which is located internally in the concrete, which process causes chloride ions to migrate to the anode and wherein to reduce the production of chlorine gas, the coating contains, as a chlorine scavenger, solid calcium hydroxide or barium hydroxide or mixtures thereof, the chlorine scavenger being present in an amount of at least 8% by weight based on the dry weight of the water retaining material.

2. A process as claimed in claim 1 wherein the water retaining material is calcium hydroxide.

3. A process as claimed in claim 1 wherein the water retaining material is adhesive.

4. A process as claimed in claim 3 wherein the water retaining adhesive material a cellulose fibre.

5. A process as claimed in claim 1 wherein the amount of chlorine scavenger is in the range 20 to 50% by weight based on the dry weight of the water retaining adhesive material.

6. A process as claimed in claim 1 wherein the anode is made of a consumable metal.

7. A process as claimed in claim 1 wherein the anode is made of an inert metal.

8. A composition for application to a concrete surface to form an adherent coating comprising:

(i) an organic material capable of retaining water, said organic material forming an adhesive mixture when mixed with water and (ii) at least 8% by weight of solid calcium or barium hydroxide based on the dry weight of the organic material.

9. A composition as claimed in claim 8 wherein the amount of calcium or barium hydroxide is from 20 to 50% by weight based on the dry weight of the organic material.

10. A composition as claimed in claim 8 wherein the organic material is cellulose fibre.

11. A composition as claimed in claim 8 which further contains water in an amount to provide an adhesive composition suitable for application to a concrete surface by spraying.

12. A method for the preparation of a composition to form an adherent coating for application to a concrete surface comprising (i) a cellulose fiber material capable of retaining water and forming an adhesive mixture when mixed with water, and (ii) at least 8% by weight of solid calcium or barium hydroxide based on the dry weight of the cellulose fiber material, which process comprises adding a chlorine scavenger to the cellulose fiber material during milling of the cellulose fiber material.

13. A method as claimed in claim 12, wherein the cellulose fiber material is obtained from waste paper, and wherein the method comprises shredding the paper, and milling the shredded paper in two stages and adding the chlorine scavenger after the first milling stage.

* * * * *

UNITED STATES PATENT AND TRADEMARK OFFICE
CERTIFICATE OF CORRECTION

PATENT NO. : 6,254,752 B1
DATED : July 3, 2001
INVENTOR(S) : Miller

It is certified that error appears in the above-identified patent and that said Letters Patent is hereby corrected as shown below:

<u>Title page,</u>
The following information should be inserted:

-- [30]  Foreign Application Priority Data
Feb. 15, 1997            (GB) ……………………..97003167.8 --.

<u>Column 6,</u>
Line 51, -- is -- should be inserted after "material" and before "a cellulose fiber".

<u>Column 8,</u>
Lines 3-5, after "fiber material," the claim should read: -- which comprises adding the calcium or barium hydroxide to the cellulose fiber material during milling of the cellulose fiber material. --.

Signed and Sealed this

Twentieth Day of May, 2003

JAMES E. ROGAN
*Director of the United States Patent and Trademark Office*